(12) United States Patent
Gschwind et al.

(10) Patent No.: US 8,453,161 B2
(45) Date of Patent: May 28, 2013

(54) METHOD AND APPARATUS FOR EFFICIENT HELPER THREAD STATE INITIALIZATION USING INTER-THREAD REGISTER COPY

(75) Inventors: Michael K. Gschwind, Chappaqua, NY (US); John K. O'Brien, South Salem, NY (US); Valentina Salapura, Chappaqua, NY (US); Zehra N. Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/787,128

(22) Filed: May 25, 2010

(65) Prior Publication Data
US 2011/0296431 A1 Dec. 1, 2011

(51) Int. Cl.
*G06F 13/00* (2006.01)
*G06F 12/00* (2006.01)
*G06F 9/30* (2006.01)

(52) U.S. Cl.
USPC ........... 719/312; 719/313; 711/147; 712/205; 712/206; 712/207

(58) Field of Classification Search
None
See application file for complete search history.

(56) References Cited

U.S. PATENT DOCUMENTS

| | | | |
|---|---|---|---|
| 3,934,232 A | 1/1976 | Curley et al. | |
| 6,782,440 B2 | 8/2004 | Miller | |
| 7,343,602 B2 | 3/2008 | Luk et al. | |
| 2005/0044552 A1* | 2/2005 | Bliss et al. | 719/312 |
| 2007/0113055 A1* | 5/2007 | Dale et al. | 712/228 |
| 2007/0113056 A1* | 5/2007 | Dale et al. | 712/228 |
| 2008/0201563 A1* | 8/2008 | Dale et al. | 712/234 |
| 2009/0328059 A1* | 12/2009 | Haba | 719/312 |
| 2011/0283095 A1* | 11/2011 | Hall et al. | 712/228 |

OTHER PUBLICATIONS

Collins et al., Speculative Precomputation: Long-range Prefetching of Delinquent Loads, International Symposium on Computer Architecture, ISCA 2001.

(Continued)

*Primary Examiner* — Qing Wu
(74) *Attorney, Agent, or Firm* — Scully, Scott, Murphy & Presser, P.C.; Daniel P. Morris, Esq.

(57) ABSTRACT

This disclosure describes a method and system that may enable fast, hardware-assisted, producer-consumer style communication of values between threads. The method, in one aspect, uses a dedicated hardware buffer as an intermediary storage for transferring values from registers in one thread to registers in another thread. The method may provide a generic, programmable solution that can transfer any subset of register values between threads in any given order, where the source and target registers may or may not be correlated. The method also may allow for determinate access times, since it completely bypasses the memory hierarchy. Also, the method is designed to be lightweight, focusing on communication, and keeping synchronization facilities orthogonal to the communication mechanism. It may be used by a helper thread that performs data prefetching for an application thread, for example, to initialize the upward-exposed reads in the address computation slice of the helper thread code.

21 Claims, 4 Drawing Sheets

OTHER PUBLICATIONS

Luk, Tolerating Memory Latency through Software-Controlled Pre-Execution in Simultaneous Multithreading Processors, International Symposium on Computer Architecture, ISCA 2001.

Hatch, Jr. et. al, Hardware/software interaction on the Honeywell model 8200, AFIPS Joint Computer Conferences, Dec. 1968.

Breach et al., the Anatomy of the Register File in a Multiscalar Processor, In Proceedings of the 27th Annual International Symposium on Microarchitecture, 1994.

Zhu et al., Synchronization State Buffer: Supporting Efficient Fine-Grain Synchronization on Many-Core Architectures, International Symposium on Computer Architecture, ISCA 2007.

Liu et al., Synchronization Mechanisms on Modern Multi-core Architectures, Annual Computer Security Applications Conference (ACSAC) 2007, pp. 290-303, LNCS 4697.

Dubey et al., Single-program speculative multithreading (SPSM) architecture: compiler-assisted fine-grained multithreading, Proceedings of the IFIP WG10.3 working conference on Parallel architectures and compilation techniques, 1995.

Tullsen et al., Simultaneous Multithreading: Maximizing On-Chip Parallelism, International Symposium on Computer Architecture, ISCA 1995.

* cited by examiner

Application Thread Code

```
1:    y = func1();
      ...
2:    i = func2();
      // copy upward-exposed reads (y & i)
3:    asm ("wrpr R(y)");
4:    asm ("wrpr R(i)");
      // start pre-fetching in helper thread
5:    func_addr = &slice_func_1;
6:    while (i < condition) {
         ...
7:       x = func3();
         ...
8:       func4( A[i] );
         ...
9:       i += y;
10:   }
```

Fig. 4A

Helper Thread Slice Function

```
void slice_func_1(int thd_id) {
1:    int y, i;
2:    asm ("rdpr R(y)");
3:    asm ("rdpr R(i)");
4:    while (i < condition) {
                                // pre-fetch request
5:       dcbt( &A[i] );
6:       i += y;
7:    }
}
```

Fig. 4B

METHOD AND APPARATUS FOR EFFICIENT HELPER THREAD STATE INITIALIZATION USING INTER-THREAD REGISTER COPY

FIELD

The present disclosure relates generally to computer systems and thread synchronization, and more particularly to fast, efficient communication of data between two hardware threads in a computing system.

BACKGROUND

In concurrent systems such as the multi-processing or multi-threaded systems, multiple threads may run in parallel, each thread running in its own context. The data values used by one thread is not directly visible or accessible by another thread, for instance, including each thread's register values. Currently there is a lack of hardware support threads to efficiently communicate data from one to another.

For example, while there are systems available that use another thread to pre-fetch data for the main thread, they do not use hardware support to allow one thread to efficiently communicate data to another thread, for instance, the data that tells the helper thread when to start or stop the prefetching. Without suitable hardware support, the overhead of repeatedly invoking a helper thread for data prefetching at different points in the application program can be very high. This overhead can also negate any performance benefits obtained as a result of the data prefetching.

Moreover, most methods for inter-thread communication are meant to be used primarily for synchronization or locking purposes. Those methods usually incur additional overhead and/or are designed to go through the shared memory hierarchy, which can also incur overhead. While there have also been proposals for efficient, hardware-assisted copying of register values between threads, these proposals are limited in that they can only copy the entire register file or a fixed subset of the register file, and they do not scale with increasing numbers of registers. Thus, what is desirable is a generic inter-thread communication mechanism capable of transferring arbitrary data values between any two threads.

BRIEF SUMMARY

A system and method of communicating register values between hardware threads in a multi-threaded computing system are provided. The system, in one aspect, may include a processor operable to run a plurality of hardware threads and a dedicated buffer accessible by the plurality of hardware threads. The system may also include a hardware write instruction that stores a register value of a source register of a producer hardware thread into a next empty slot in the dedicated buffer. The system may further include a hardware read instruction that stores an oldest value from the dedicated buffer into a target register of a consumer hardware thread. The producer hardware thread and the consumer hardware threads are threads running on the processor and accessing the dedicated buffer.

The method of communicating register values between hardware threads in a multi-threaded computing system, in one aspect, may include a first hardware thread writing data contained in a specified register in the first hardware thread's context, to a dedicated buffer accessible to a plurality of hardware threads, the dedicated buffer operating as a first-in-first-out storage. The method may also include a second hardware thread reading data from the dedicated buffer and copying the data into a specified register in the second hardware thread's context.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A thread is a logical flow that runs or executes in the context of a computer program process. Programs can have multiple threads running concurrently. Each thread has its own thread context, for example, including a unique integer thread identifier, stack, stack pointer, program counter, and general-purpose registers.

The present disclosure, in one aspect, describes a method of enabling fast, hardware-assisted, producer-consumer style communication of values between threads in multi-threaded computer processing systems. The method of the present disclosure may use a dedicated hardware buffer as an intermediary storage for transferring values from registers in one thread to registers in another thread. The method is a generic, programmable solution that can transfer any subset of register values between threads in any given order, where the source and target registers may or may not be correlated. The method allows for determinate access times, since it completely bypasses the memory hierarchy of a computer.

Briefly, registers are local storage areas within the processor (e.g., inside the central processing unit (CPU)). Registers hold data and addresses that are being worked on by the processor. The register file is the component that contains all the general purpose registers of the microprocessor. Typically, registers are hard-wired into the processor logic and therefore the processors can access the data in the registers fast.

The method is designed to be lightweight, focusing on communication, and keeping synchronization facilities orthogonal to the communication mechanism. The method may be used by a helper thread that performs data prefetching for an application thread, to initialize the upward-exposed reads in the address computation slice of the helper thread code. Here, an address computation slice refers to helper thread code that is generated by slicing sections of code from the application, and retaining only those code portions that relate to computing the addresses of data to be prefetched. Also, an upward-exposed read refers to a variable value set outside the helper thread code (e.g., in the application code), which the helper threads needs to know to be able to prefetch data for the application thread.

Figure 1:
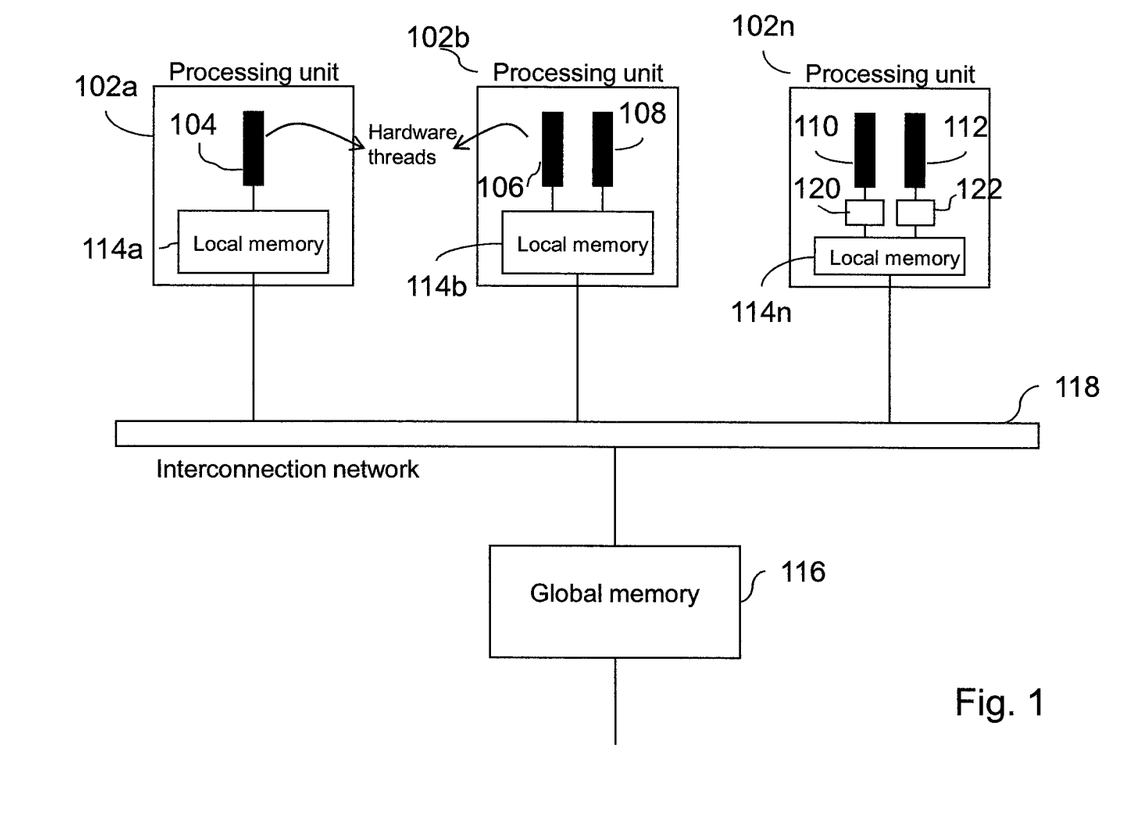
FIG. 1 shows an example multicore processor architecture.

FIG. 1 shows an example architecture for a multicore processor that comprises of multiple processing units. Each processing unit (102a, 102b, . . . , 102n) of the multicore processor 100 supports one or more hardware thread(s) of execution (e.g., 104, 106, 108, 110, 112). The processing units (102a, 102b, . . . , 102n) share access to one or more levels of the memory hierarchy (114a, 114b, 114n, 116) through an interconnection network 118. Elements 120 and 122 may be a level of memory that is local to each hardware thread, which is not shared between hardware threads (110, 112) that are on the same processing unit.

Computer memory hierarchy refers to storage devices organized into hierarchies in a computer memory system. Typically the memory hierarchy may range in the order from processor registers, to small and fast cache (e.g., static random access memory (SRAM)) nearby the processor, to main memory (e.g., dynamic random access memory (DRAM)), to hardware disk to tapes or the like. Also typically, as the level of the memory hierarchy goes down (i.e., from registers to tapes), the speed of access decreases but the storage capacity increases.

When an application does not exhibit enough parallelism to effectively use all available hardware threads, the extra threads can be used as helper threads to improve the performance of the application threads. The execution of the helper thread may be closely tied to the execution of the application thread that it is trying to speed up, and so the helper thread may need to synchronize with the application thread.

Figure 2A:
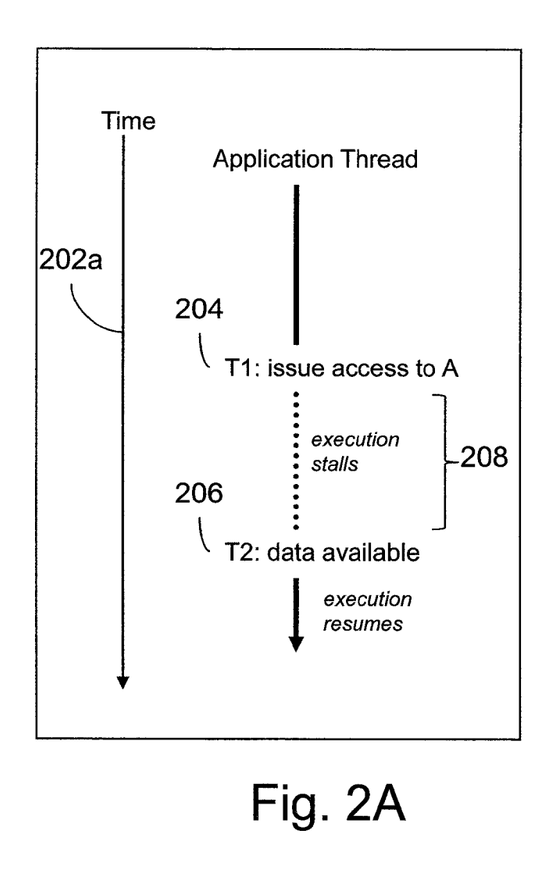
FIG. 2 illustrates how data prefetching works with a helper thread in one embodiment of the present disclosure.
Figure 2B:
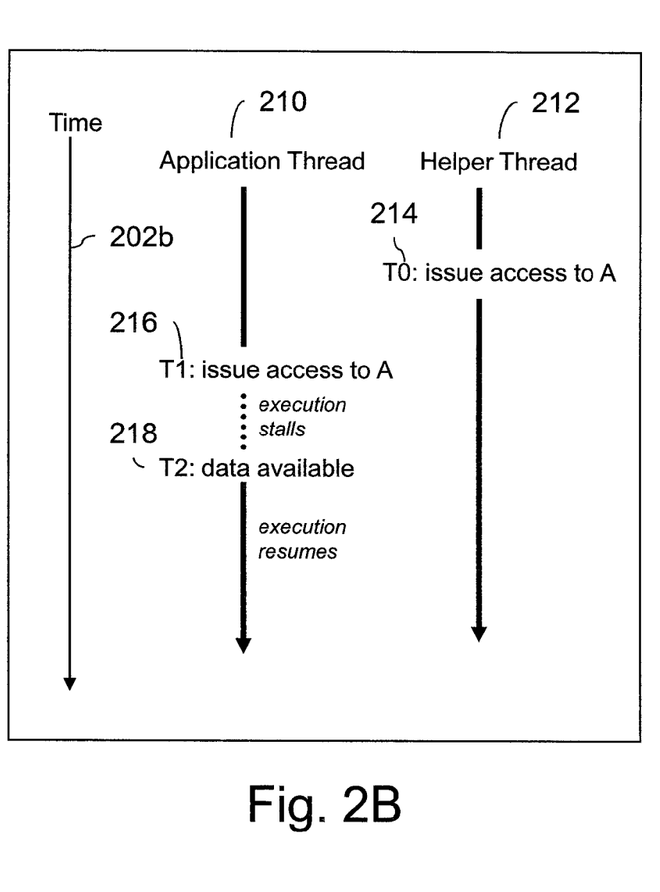

An example use of helper threads is for data prefetching. Data prefetching is a technique used to reduce the number of memory stalls, and thus improve performance. FIGS. 2A and 2B illustrate how data prefetching works with a helper thread. In the example shown in FIG. 2, the timeline (202a, 202b) progresses forward from top to bottom. FIG. 2A shows a single application thread with no helper thread. The application thread issues a memory access for memory address A at point T1 (204). The time interval (208) between T1 (204) and T2 (206) is spent fetching data from higher levels of the memory hierarchy into the cache closest to the processor. At point T2 (206), data from memory address A is available to the application thread, and it can use it for further computation.

FIG. 2B shows two hardware threads (210, 212): an application thread (210), and a helper thread (212) that performs data prefetching. In this example case, the helper thread (212) issues a memory access for address A at point T0 (214), which is earlier than point T1 (216) when the application thread issues its memory access. The corresponding data becomes available for the application thread to use at point T2 (218). Since the application thread (210) and helper thread (212) both have shared access to some level in the memory hierarchy, the earlier access issued by the helper thread (212) causes the time interval T1 to T2 to be reduced. As a result, the application thread waits for a shorter time for the memory access to complete, which can lead to better performance.

There are several advantages to using a separate thread to perform data prefetching. The prefetch code can handle arbitrary access patterns and can be modified to suit the needs of the target application or architecture, and the assist (helper) thread execution can asynchronously run-ahead and prefetch data for a large number of accesses. However, this asynchronous execution can be challenging as well, because the helper thread may need to independently determine the sequence of memory addresses that will be accessed in the application thread. Code for the helper thread is generated by slicing sections of code from the application, and retaining only those code portions that relate to computing the addresses of data to be prefetched. Since these code portions are extracted from different points within the application, they typically have upward exposed reads in the original application code. Upward exposed reads refer to values of variables that have been determined in the application code outside the helper thread code, which the helper thread code needs to determine the location or address of the data to be prefetched. When executing in the helper thread, the data corresponding to the upward exposed reads needs to be communicated from the application thread to the helper thread, to correctly initialize the computation in the helper thread. If the overhead for this communication is high, it can undermine the efficacy of helper thread prefetching.

A hardware mechanism is disclosed in the present disclosure, in one aspect, that may quickly and efficiently communicate data values from one thread to another thread, for example, the application thread to the assist (helper) thread. The hardware mechanism of the present disclosure can be exploited by software to communicate register values between two hardware threads. In one aspect, the hardware uses a dedicated buffer as a first-in-first-out (FIFO) store (or storage) for intermediate storage of data. The FIFO buffer includes a head pointer and a tail pointer. The head pointer points to the first entry in the dedicated buffer and the tail pointer points to the last entry in the buffer. Thus, to read from the dedicated buffer, the data content of the location in the dedicated buffer pointed by the head pointer is retrieved. The head pointer may be then advanced to point to the next data entry in the dedicated buffer. To write to the dedicated buffer, the data is written to the location following the last entry in the buffer pointed to by the tail pointer. The tail pointer is then advanced to point to the currently written entry.

The hardware also supports new instructions to copy the next value in the FIFO buffer from or to a specific register. To support the new hardware instructions, in one aspect, the Instruction Set Architecture (ISA) for the machine is updated to define the form and semantics of the new instructions, and the hardware logic for the processing unit is changed to accordingly decode and execute these instructions. Using this mechanism, software can copy any number of registers in any specified order from one thread (the producer thread) to any other thread (the consumer thread). Also, during the copy, the source and target register in the two threads may be correlated, i.e., data is copied into the same register number in the consumer thread as the register number from which the data was sourced in the producer thread. In another embodiment, the source and target register numbers need not be correlated, and the register that is the target of the copy is explicitly specified as part of the newly supported instruction.

The dedicated buffer may be an SRAM device or the like that, for example, has relatively fast access time. The dedicated buffer may be accessible by a plurality of threads and shared between/among the plurality of threads. For instance, the dedicated buffer may be architected as registers accessible by the new hardware instructions. The dedicated buffer provides an extra storage for pure communication of values between threads. The dedicated buffer need not be tied or fixed to a specific architected register, but can be used to transfer any value between specific registers of different threads. The use of such dedicated buffer also separates the function of communicating data values between threads from the synchronization operations. This separation explicitly separates synchronization overhead from the cost of communication. Also, unlike the shared memory mechanisms, there is no need for one thread to go through the memory hierarchy of a system for accessing data of another thread, or to allocate and deallocate the memory to be shared. Compared to using shared memory, use of a dedicated buffer incurs less execution overhead and a fixed latency.

Figure 3:
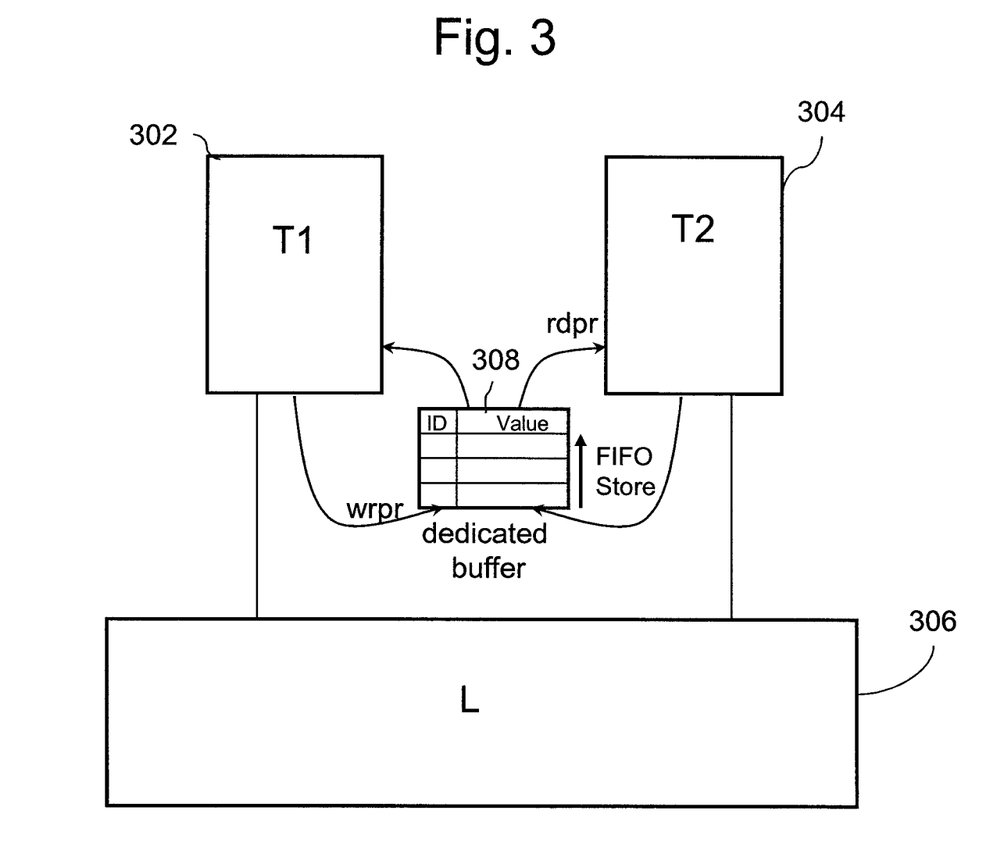
FIG. 3 shows a hardware implementation of a communication mechanism in one embodiment of the present disclosure.

FIG. 3 shows an implementation in one embodiment of a communication mechanism of the present disclosure. In the figure, T1 (302) and T2 (304) are hardware threads and L (306) is the first level of memory cache that is shared between T1 (302) and T2 (304). In one embodiment, T1 (302) and T2 (304) are threads on a single processor core that supports simultaneous multithreading, and they can both access a special dedicated buffer (308). Simultaneous multithreading is described in "Simultaneous Multithreading: Maximizing On-Chip Parallelism", D. M. Tullsen, S. J. Eggers, and H. M. Levy, International Symposium on Computer Architecture, ISCA 1995.

In another embodiment, T1 (302) and T2 (304) may be threads in separate processor cores in a chip multiprocessor, with both threads having access to a special dedicated buffer (308). In yet another embodiment, there may be more than two threads, spread across multiple cores, such that all threads have access to a special dedicated buffer (308). This dedicated buffer (308) is designed to operate as a first-in-first-out (FIFO) store.

In the present disclosure, new hardware instructions are disclosed to write to or read from the special dedicated buffer in the system. The instruction "wrpr Rx" stores the value of register Rx of a processor into the next slot in the special dedicated buffer. It also stores the register number of register Rx as the identifier (ID) corresponding to that slot. The instruction "rdpr Rx" stores into register Rx of a processor the oldest value from the special dedicated buffer, and then discards that value from the dedicated buffer by advancing the FIFO pointer.

Thus, in one embodiment, a write instruction, e.g., "wrpr" takes as an operand a register identifier, e.g., "Rx" from which to read the data for storing into the dedicated buffer. A read instruction, e.g., "rdpr" takes as an operand a register identifier, e.g., "Rx", into which to store the data read from the dedicated buffer.

In another embodiment, the format of the read instruction "rdpr" does not explicitly specify a target register. In this case, the previously stored ID corresponding to the oldest slot in the dedicated buffer determines the register Rx that will be the target of the "rdpr" instruction.

The special dedicated buffer (308) used implements a limited store queue. It is possible that when a "wrpr" instruction is issued, there is no empty slot in the queue. This overflow may be handled using one of several methods. For instance, either the "wrpr" instruction can be ignored if there is no empty slot, or it can displace the oldest value previously held in the store queue, or it can raise an interrupt that allows the software thread to take appropriate action, or a blocking form of the "wrpr" instruction can be used that waits for a slot in the queue to free up. Also, when a "rdpr" instruction is issued when the store queue is empty, the "rdpr" instruction can be ignored, or it can raise an interrupt that allows the software thread to take appropriate action, or a blocking form of the "rdpr" instruction can be used that waits for a slot to be written into the store queue.

Figure 4A:
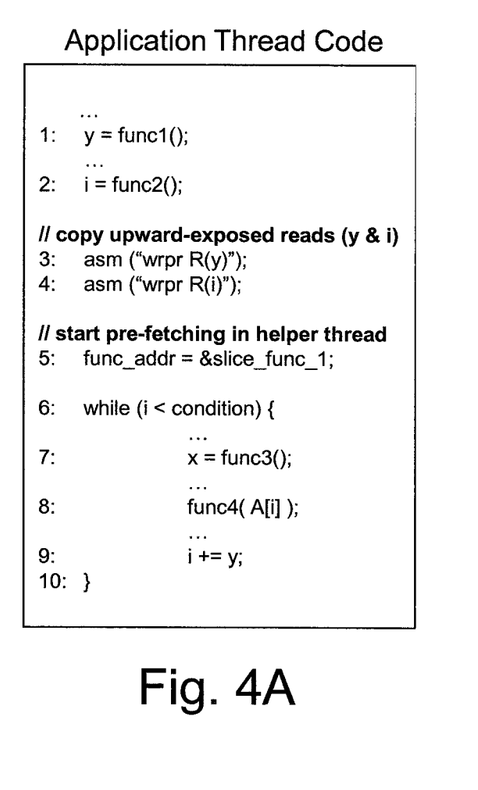
FIG. 4 illustrates how a communication mechanism in one embodiment of the present disclosure may be used by a helper thread performing data prefetching.
Figure 4B:
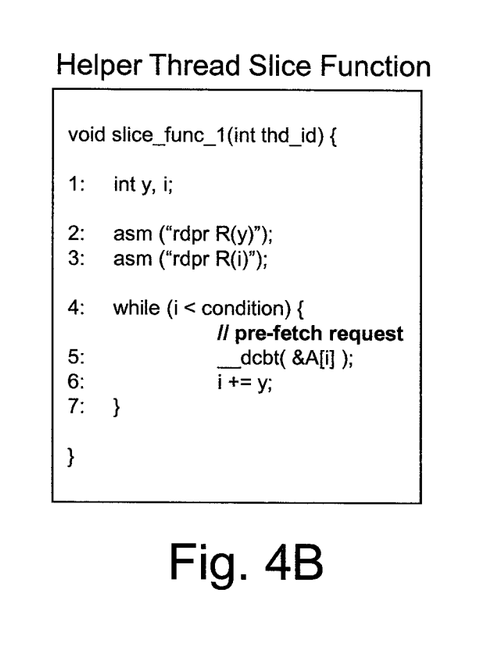

FIG. 4 shows example code segments that illustrate how the communication mechanism in one aspect may be used by a helper thread performing data prefetching. FIG. 4A shows example code that is part of an application thread, and FIG. 4B shows the corresponding code that executes in the helper thread. The sequence of accesses of "A[i]" on line 8 in FIG. 4A is the data accesses that are being prefetched by the helper thread. The while loop on line 6 of FIG. 4A corresponds to the while loop on line 4 of FIG. 4B. This while loop in the helper thread only performs computation necessary to determine the sequence of addresses to be prefetched, and issues prefetch instructions for these addresses. In the example, the values of local variables "y" and "i" are used in the address computation. The register containing the value of "y" is denoted by R(y), and the register containing the value of "i" is denoted by R(i). Before beginning the computation of its while loop, the helper thread slice function needs to obtain the values of "y" and "i" at the entry point of the while loop in the application thread. This communication of values is done using the assembly instructions wrpr and rdpr. The application thread copies to the special dedicated buffer the values of registers containing "y" and "i", on lines 3 and 4 of FIG. 4A. The application thread then indicates to the helper thread that it should invoke the slice function to begin prefetching (line 5 of FIG. 4A). When invoked, the helper thread slice function first copies the initial values of "y" and "i" into its local registers, on lines 2 and 3 of FIG. 4B.

The hardware support disclosed herein is a general mechanism that can be used to quickly and efficiently communicate data values from one thread to another thread. The mechanism clearly separates synchronization from communication, so code can be optimized to avoid the overhead of extraneous synchronization. The mechanism completely bypasses the memory hierarchy, allowing for determinate access times, i.e., access time is known. Determinate access times make it possible to efficiently build systems for critical real-time computing. Determinate access times also allow better performance tuning of parallel programs, since communication and computation times can be estimated more accurately and it becomes easier to balance them. Furthermore, not using the memory chips in the communication mechanism adds to its reliability, since memory chips can fail more easily. Instead of the memory hierarchy, the solution of the present disclosure uses a dedicated hardware buffer which circumvents the need for memory to be allocated and de-allocated during execution, which results in higher performance. Also, solution of the present disclosure is unique in that it provides efficiency comparable to register-register transfers, while still keeping data transfer costs proportional to the needs of a specific application.

The present disclosure describes a method, in one aspect, to enable fast, hardware-assisted, producer-consumer style communication of values between threads. The method uses a dedicated hardware buffer as an intermediary storage for transferring values from registers in one thread to registers in another thread. The method is a generic, programmable solution that can transfer any subset of register values between threads in any given order, where the source and target registers may or may not be correlated. The method allows for determinate access times, since it completely bypasses the memory hierarchy. Also, the method is designed to be lightweight, focusing on communication, and keeping synchronization facilities orthogonal to the communication mechanism. It is ideal for use by a helper thread that performs data prefetching for an application thread, to initialize the upward-exposed reads in the address computation slice of the helper thread code.

New hardware instructions allow copying any subset of registers form one thread to another. An example use of such copying of data between threads may be for initializing the slice functions in helper threads that target data prefetching.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner (not shown), speaker, and any other devices, directly or via remote connections. The computer processing system may be connected or coupled to one or more other processing systems such as a server, other remote computer processing system 14, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The use of the terms "first", "second", "third", etc., if any, for example, that modify elements in a claim, for instance, first element, second element, etc., does not denote any order or importance, unless clearly indicated otherwise.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of communicating register values between hardware threads in a multi-threaded computing system, comprising:
    a first hardware thread writing data contained in a specified register in the first hardware thread's context, to a dedicated buffer accessible by a plurality of hardware threads, the dedicated buffer operating as a first-in-first-out storage; and
    a second hardware thread reading data from the dedicated buffer and copying the data into a specified register in the second hardware thread's context.

2. The method of claim 1, wherein a write instruction that stores data contained in the specified register in the first hardware thread's context into a next empty slot in the dedicated buffer is used to write to the dedicated buffer.

3. The method of claim 2, wherein the write instruction takes as an operand an identifier of the specified register in the first hardware thread's context, from which to get the data for storing into the next empty slot in the dedicated buffer.

4. The method of claim 2, wherein the write instruction stores an identifier of the specified register in the first hardware thread's context along with the data in the next empty slot in the dedicated buffer.

5. The method of claim 1, wherein a read instruction that reads an oldest entry in the dedicated buffer is used to read from the dedicated buffer and store the data into the specified register in the second hardware thread's context.

6. The method of claim 5, wherein the read instruction takes as an operand the specified register in the second hardware thread's context.

7. The method of claim 5, wherein the read instruction determines the specified register in the second hardware thread's context from a stored identifier corresponding to the oldest entry in the dedicated buffer.

8. The method of claim 1, wherein the first hardware thread is an application thread and the second hardware thread is a helper thread that prefetches data for the application thread, and the dedicated buffer is used to communicate data used to initialize variable values used by the helper thread.

9. A system for communicating register values between hardware threads in a multi-threaded computing system, comprising:
a processor operable to run a plurality of hardware threads;
a dedicated buffer accessible by the plurality of hardware threads;
a write instruction for storing a register value of a source register of a producer hardware thread into a next empty slot in the dedicated buffer; and
a read instruction for storing an oldest value from the dedicated buffer into a target register of a consumer hardware thread,
wherein the producer hardware thread and the consumer hardware threads are threads running on the processor and accessing the dedicated buffer.

10. The system of claim 9, wherein the write instruction takes as an operand an identifier of the source register in producer hardware thread's context, from which to get the register value for storing into the next empty slot in the dedicated buffer.

11. The system of claim 10, wherein the write instruction stores an identifier of the source register in the producer hardware thread's context along with the register value in the next empty slot in the dedicated buffer.

12. The system of claim 9, wherein the read instruction takes as an operand an identifier of the target register in consumer hardware thread's context.

13. The system of claim 9, wherein the read instruction determines the target register of the consumer hardware thread in which to store the oldest entry in the dedicated buffer by reading a stored identifier corresponding to the oldest entry in the dedicated buffer.

14. A non-transitory computer readable storage medium storing a program of instructions executable by the machine to perform a method of communicating register values between hardware threads in a multi-threaded computing system, comprising:
a first hardware thread writing data contained in a specified register in the first hardware thread's context, to a dedicated buffer accessible by a plurality of hardware threads, the dedicated buffer operating as a first-in-first-out storage; and
a second hardware thread reading data from the dedicated buffer and copying the data into a specified register in the second hardware thread's context.

15. The non-transitory computer readable storage medium of claim 14, wherein a write instruction that stores data contained in the specified register in the first hardware thread's context into a next empty slot in the dedicated buffer is used to write to the dedicated buffer.

16. The non-transitory computer readable storage medium of claim 15, wherein the write instruction takes as an operand an identifier of the specified register in the first hardware thread's context, from which to get the data for storing into the next empty slot in the dedicated buffer.

17. The non-transitory computer readable storage medium of claim 15, wherein the write instruction stores an identifier of the specified register in the first hardware thread's context along with the data in the next empty slot in the dedicated buffer.

18. The non-transitory computer readable storage medium of claim 14, wherein a read instruction that reads an oldest entry in the dedicated buffer is used to read from the dedicated buffer and store the data into the specified register in the second hardware thread's context.

19. The non-transitory computer readable storage medium of claim 18, wherein the read instruction takes as an operand the specified register in the second hardware thread's context.

20. The non-transitory computer readable storage medium of claim 18, wherein the read instruction determines the specified register in the second hardware thread's context from a stored identifier corresponding to the oldest entry in the dedicated buffer.

21. The non-transitory computer readable storage medium of claim 14, wherein the first hardware thread is an application thread and the second hardware thread is a helper thread that prefetches data for the application thread, and the dedicated buffer is used to communicate data used to initialize variable values used by the helper thread.

* * * * *